(12) United States Patent
Kajiyama et al.

(10) Patent No.: US 9,110,274 B2
(45) Date of Patent: Aug. 18, 2015

(54) CATADIOPTRIC OPTICAL SYSTEM AND IMAGE-PICKUP APPARATUS HAVING THE SAME

(75) Inventors: Kazuhiko Kajiyama, Utsunomiya (JP); Masayuki Suzuki, Utsunomiya (JP); Yuji Katashiba, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 473 days.

(21) Appl. No.: 13/579,100

(22) PCT Filed: Apr. 20, 2011

(86) PCT No.: PCT/JP2011/060197
§ 371 (c)(1),
(2), (4) Date: Aug. 15, 2012

(87) PCT Pub. No.: WO2011/136240
PCT Pub. Date: Nov. 3, 2011

(65) Prior Publication Data
US 2012/0314052 A1    Dec. 13, 2012

(30) Foreign Application Priority Data

Apr. 28, 2010    (JP) .................................. 2010-103612

(51) Int. Cl.
*G02B 17/08*    (2006.01)

(52) U.S. Cl.
CPC ........ *G02B 17/0808* (2013.01); *G02B 17/0856* (2013.01)

(58) Field of Classification Search
USPC ......................................................... 348/79
See application file for complete search history.

(56) References Cited

U.S. PATENT DOCUMENTS

| 4,208,099 | A | | 6/1980 | Tojyo |
| 4,971,428 | A | * | 11/1990 | Moskovich ................... 359/366 |
| 6,473,243 | B1 | | 10/2002 | Omura |
| 2001/0038446 | A1 | | 11/2001 | Takahashi |
| 2003/0030917 | A1 | * | 2/2003 | Omura .......................... 359/691 |
| 2004/0165257 | A1 | | 8/2004 | Shafer et al. |

(Continued)

FOREIGN PATENT DOCUMENTS

| JP | 53-112759 A | 10/1978 |
| JP | 2002-118058 A | 4/2002 |

(Continued)

OTHER PUBLICATIONS

International Search Report issued Apr. 20, 2011 for parent PCT/JP2011/060197.

(Continued)

*Primary Examiner* — Michael Teitelbaum
(74) *Attorney, Agent, or Firm* — Rossi, Kimms & McDowell LLP

(57) ABSTRACT

A catadioptric optical system of the present invention includes a catadioptric unit configured to condense light fluxes from an object and to form an intermediate image of the object, a field lens disposed at a position where the intermediate image are formed, and a dioptric unit configured to form the intermediate image on an image surface, and when vcat denotes a smallest Abbe number in Abbe numbers of materials of the first and second optical elements configuring the catadioptric unit and vdio denotes a smallest Abbe number in Abbe numbers of materials of a plurality of dioptric optical elements configuring the dioptric unit, vdio<vcat is satisfied.

6 Claims, 9 Drawing Sheets

(56) References Cited

U.S. PATENT DOCUMENTS

2004/0240047 A1  12/2004  Shafer et al.
2008/0117532 A1*  5/2008  Shafer .......................... 359/727

FOREIGN PATENT DOCUMENTS

| JP | 2006-518876 A | 8/2006 |
| JP | 2007-514179 A | 5/2007 |
| WO | 0039623 A1 | 7/2000 |
| WO | 2005/022204 A2 | 3/2005 |

OTHER PUBLICATIONS

Chinese Office Action for corresponding CN 201180020384.8, mail date Mar. 31, 2014. English translation Provided.

* cited by examiner

_US 9,110,274 B2_

CATADIOPTRIC OPTICAL SYSTEM AND IMAGE-PICKUP APPARATUS HAVING THE SAME

This application is a U.S. National Phase Application of PCT International Application PCT/JP2011/060197 filed on Apr. 20, 2011 which is based on and claims priority from JP2010-103612 filed on Apr. 28, 2010 the contents of which is incorporated in its entirety by reference.

TECHNICAL FIELD

The present invention relates to a catadioptric optical system which is suitable for enlarging an object for observations, and an image pickup apparatus having the same

BACKGROUND ART

In the present pathological examination, a pathological sample (object) is directly observed with a human eye using an optical microscope. In recent years, something called a virtual microscope is used, which captures a pathological sample as image data and enables it to be observed on a display. Since the virtual microscope enables the image data of the pathological sample to be observed on the display, a plurality of people can observe it at the same time. Moreover, this virtual microscope has many advantages, for example a diagnosis can be requested by sharing the image data with a distant pathologist. This method, however, needs a long time to take an image of a pathological sample and to capture its image data.

One factor taking a long time is that a large image-pickup range of a pathological sample has to be captured as image data by using a narrow image-pickup area of a microscope. For a narrow image-pickup area of a microscope, it is required to take images multiple times or through scanning and to synthesize them into one image. An (image-pickup) optical system having a wide image-pickup area is required in order to make the number of shots smaller and to make an image capturing time period shorter than ever.

In the observation of the pathological sample, as the wide image-pickup area is required, an optical system having a high resolution in a viewable area is required.

Japanese Patent Publication No. S60-034737 discloses an objective lens of a microscope which includes a dioptric optical system, reduces aberrations well in the entire visible light range, and is suitable for observing a biologic cell or anything. Moreover, Japanese Domestic Publication of International Patent Application No. 2007-514179 discloses a catadioptric imaging system for a broadband microscope which includes a catadioptric optical system having a high resolution in the entire visible light range and is configured to detect defects in an integrated circuit or a photomask. WO00/39623 discloses a catadioptric imaging system which is suitable for manufacturing a semiconductor device and configured to expose micro patterns on a wide area with light of an ultraviolet wavelength region.

However, the objective lens of the microscope disclosed in Japanese Patent Publication No. S60-034737 reduces aberrations well in the entire visible light range, but the size of the observation area is not sufficient.

Moreover, the catadioptric imaging system disclosed in Japanese Domestic Publication of International Patent Application No. 2007-514179 reduces aberrations well in the entire visible light range and provides high resolution, but the size of the observation area is not sufficient.

The catadioptric imaging system disclosed in WO00/39623 provides a high resolution, but a wavelength region which corrects aberrations well is not sufficient.

Accordingly, the present invention provides a catadioptric optical system configured to correct aberrations well in the entire visible light range and to provide a high resolution in a wide image-pickup area, and an image-pickup apparatus having the same.

SUMMARY OF INVENTION

A catadioptric optical system as one aspect of the present invention includes a catadioptric unit configured to condense light fluxes from an object and to form an intermediate image of the object, the catadioptric unit including a first optical element including a light transmission part having a convex surface on an object side, a positive refractive power near an optical axis, and a backside reflector made by coating a reflective film on a surface on the object side in a periphery, and a second optical element including a light transmission part having a concave surface on the object side, a meniscus shape, a negative refractive power near the optical axis, and a backside reflector made by coating a reflective film on a surface on an image side, the first optical element and the second optical element being arranged in this order from the object side so that each backside reflector faces each other; a field lens disposed at a position where the intermediate image are formed, the light flux from the object passing through the light transmission part of the first optical element, the backside reflector of the second optical element, the backside reflector of the first optical element, and the light transmission part of the second optical element in this order and being emitted to the filed lens side; and a dioptric unit configured to form the intermediate image on an image surface, the dioptric unit including a plurality of dioptric optical elements. When vcat denotes a smallest Abbe number in Abbe numbers of materials of the first and second optical elements configuring the catadioptric unit, and vdio denotes a smallest Abbe number in Abbe numbers of materials of a plurality of dioptric optical elements configuring the dioptric unit, the catadioptric optical system satisfies vdio<vcat.

DESCRIPTION OF EMBODIMENTS

Figure 1:
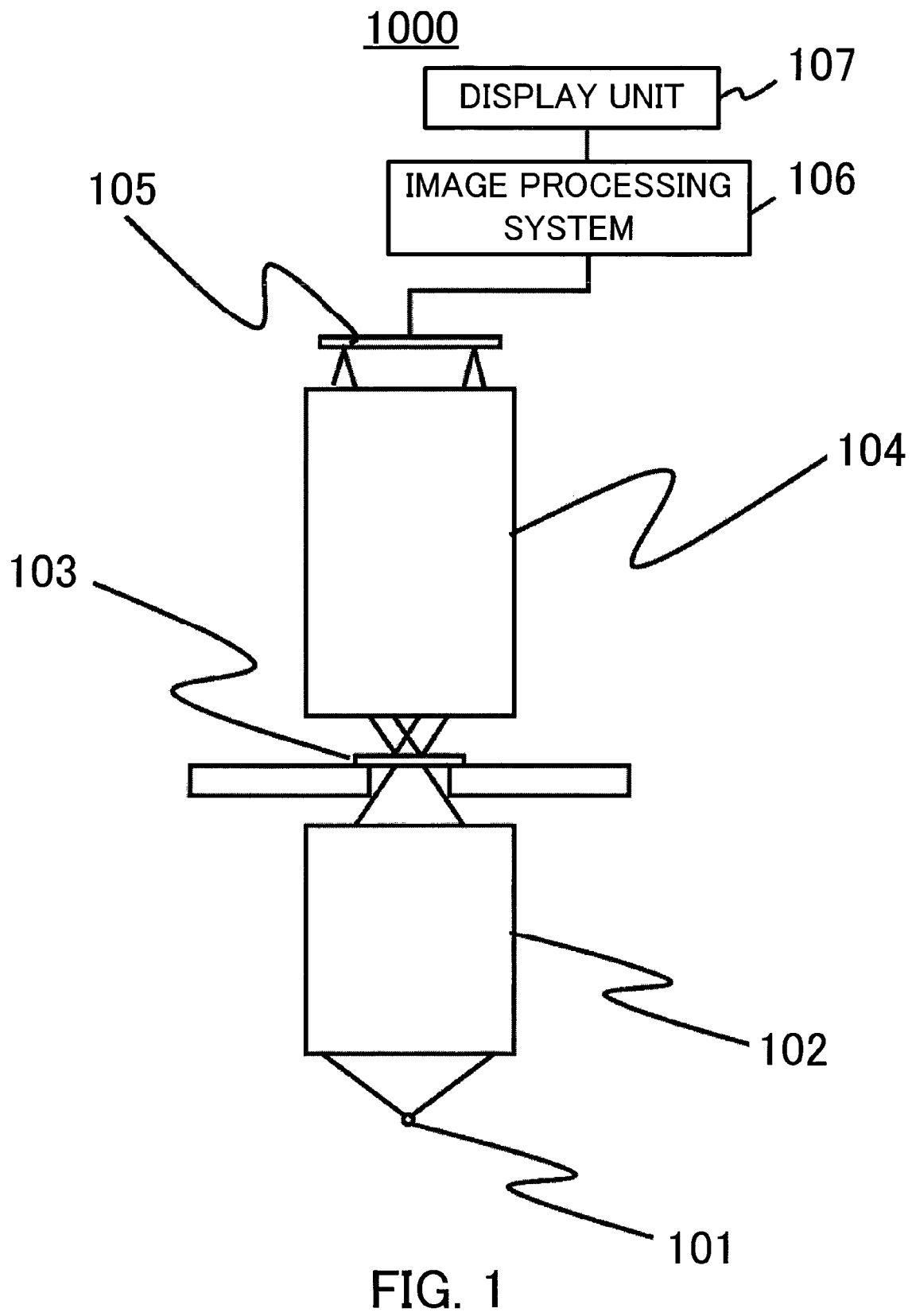
FIG. 1 is a schematic sectional diagram of an image-pickup apparatus of the present invention.

A present invention's catadioptric optical system 104 includes a catadioptric unit CAT configured to condense light fluxes from an object 103 and to form an intermediate image IM, and a field lens FL disposed at a position where the intermediate image IM is formed. It further includes a dioptric unit DIO configured to form the intermediate image IM on an image surface (image-pickup element 105).

Moreover, a present invention's image-pickup apparatus 1000 includes a light source unit 101, an illumination optical system 102 configured to illuminate the object 103 with light fluxes from the light source unit 101, and a catadioptric optical system 104 configured to form an image of the object 103. It further includes an image-pickup element 105 configured to photoelectrically convert an object image formed by the catadioptric optical system 104, and an image processing system 106 configured to generate image information based on data from the image-pickup element 105.

Figure 2:
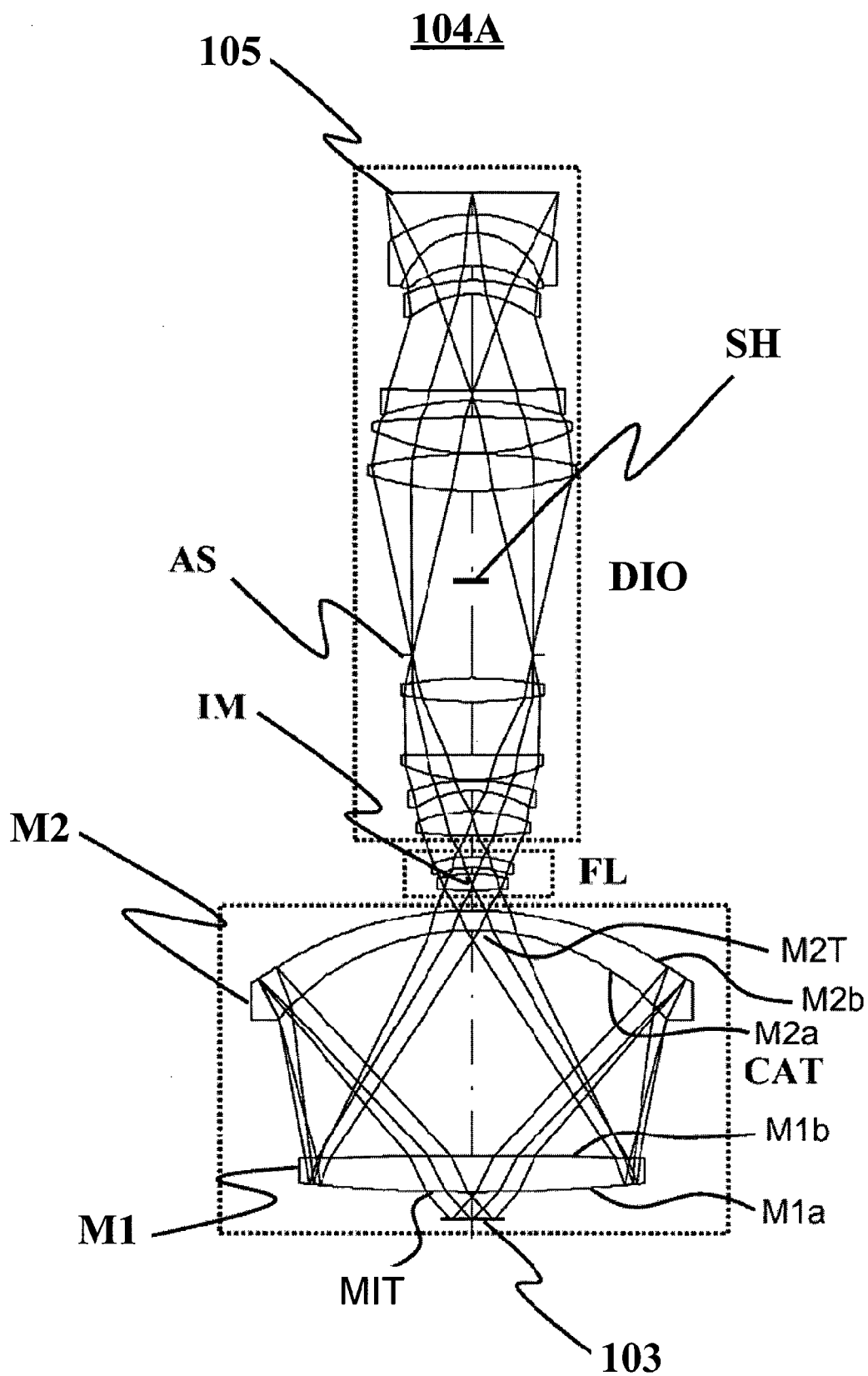
FIG. 2 is a schematic diagram of a principal part of a catadioptric optical system of embodiment 1 of the present invention.
Figure 3:
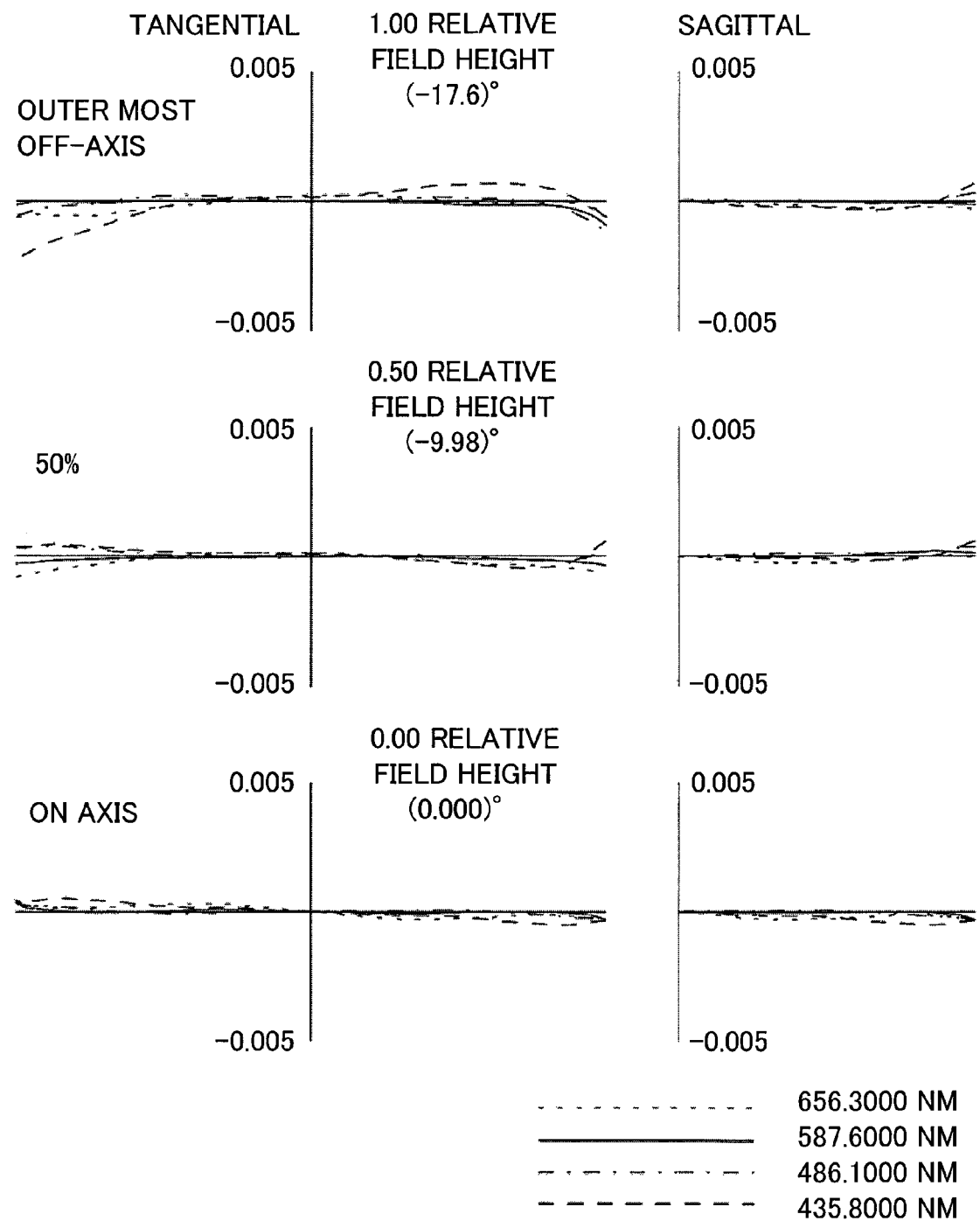
FIG. 3 is a lateral aberration diagram of the catadioptric optical system of embodiment 1 of the present invention.
Figure 4:
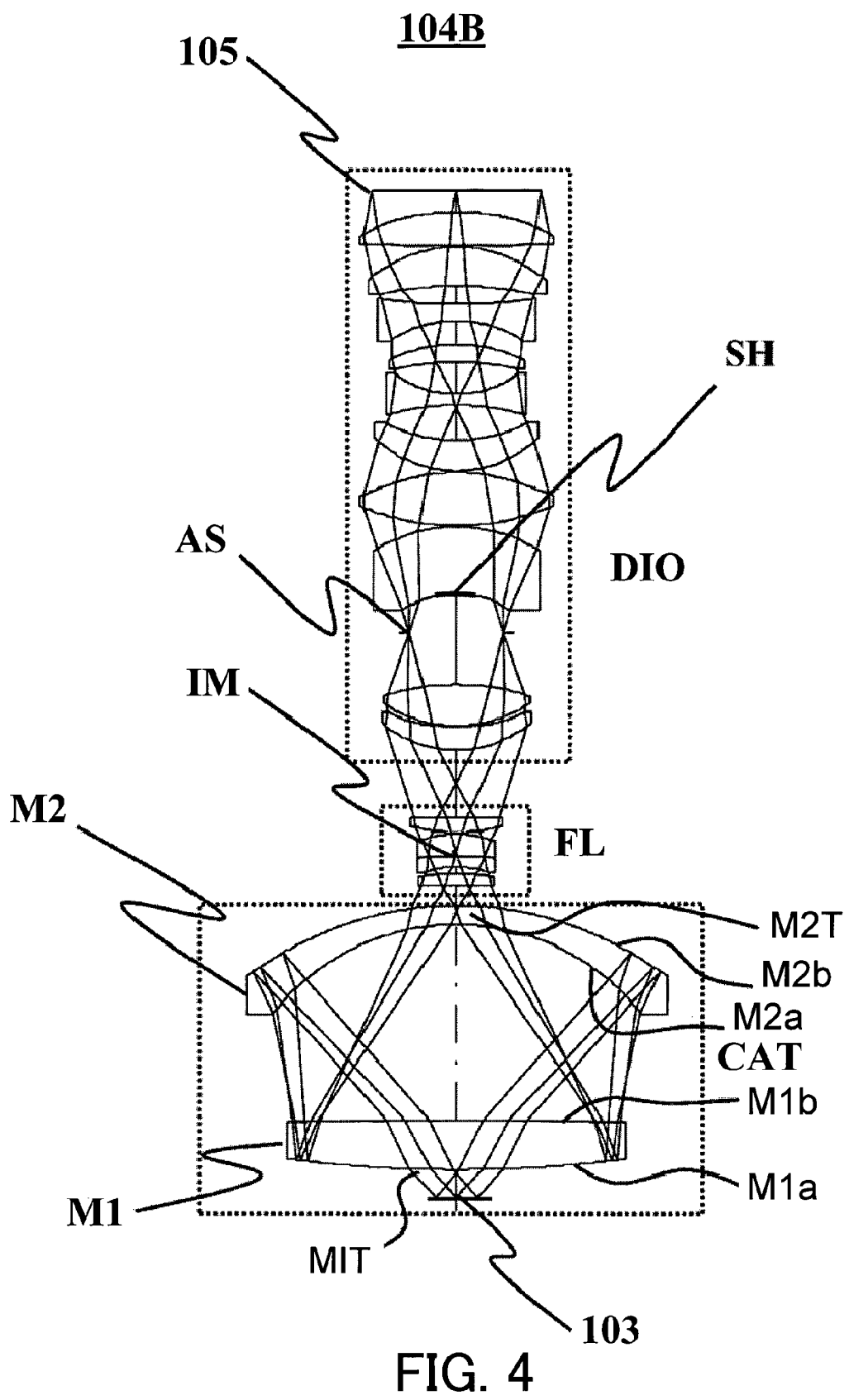
FIG. 4 is a schematic diagram of a principal part of a catadioptric optical system of embodiment 2 of the present invention.
Figure 5:
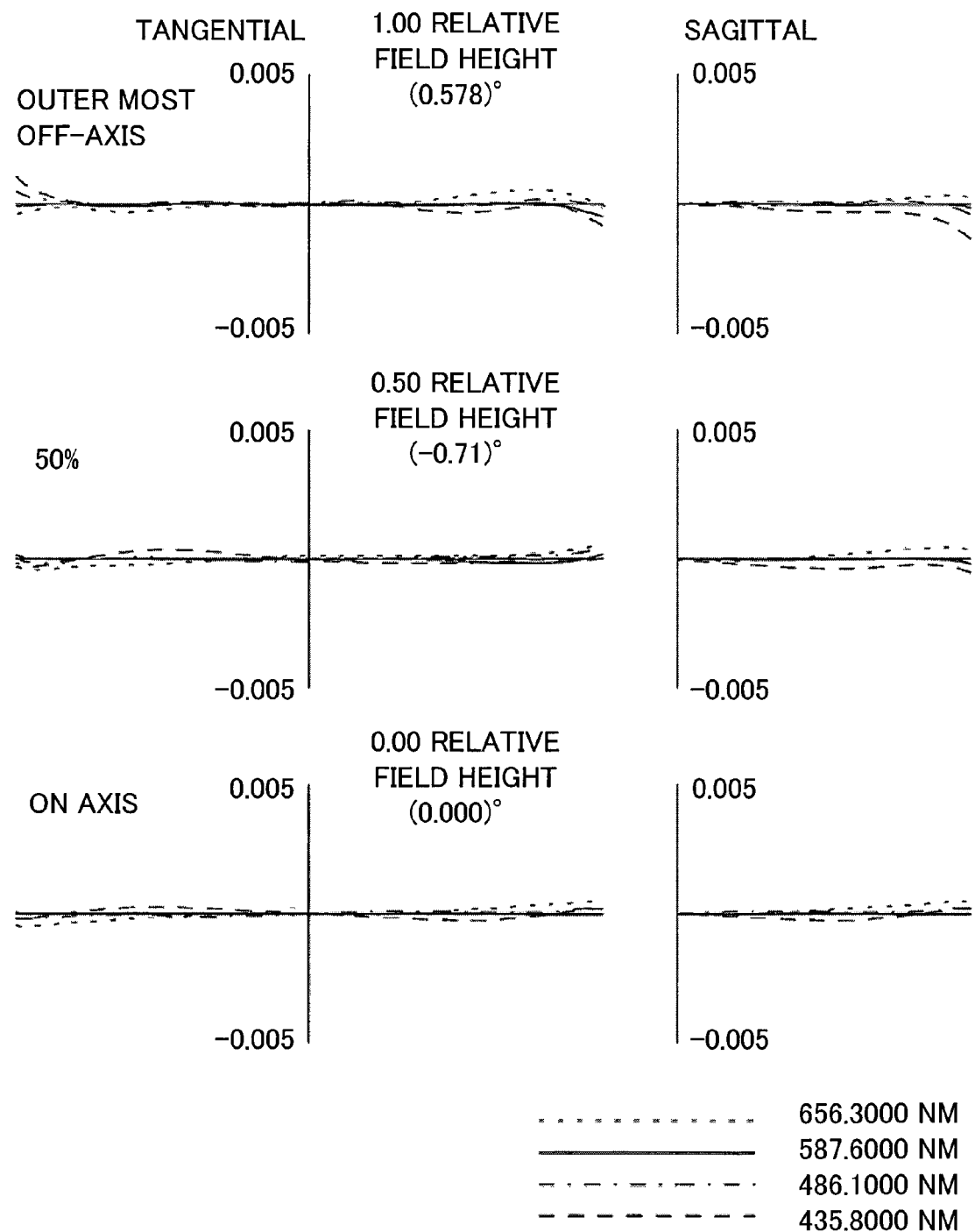
FIG. 5 is a lateral aberration diagram of the catadioptric optical system of embodiment 2 of the present invention.
Figure 6:
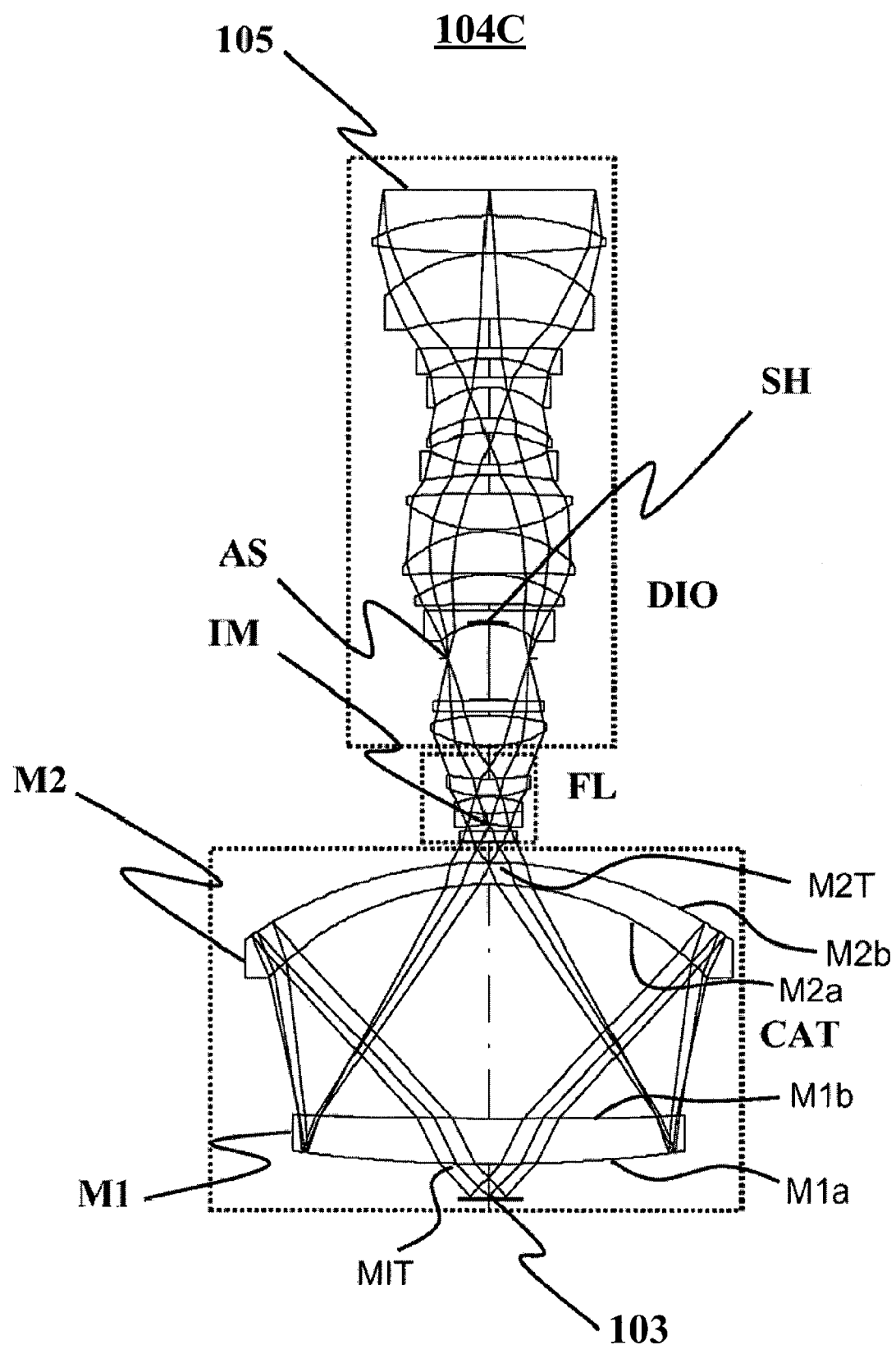
FIG. 6 is a schematic diagram of a principal part of a catadioptric optical system of embodiment 3 of the present invention.
Figure 7:
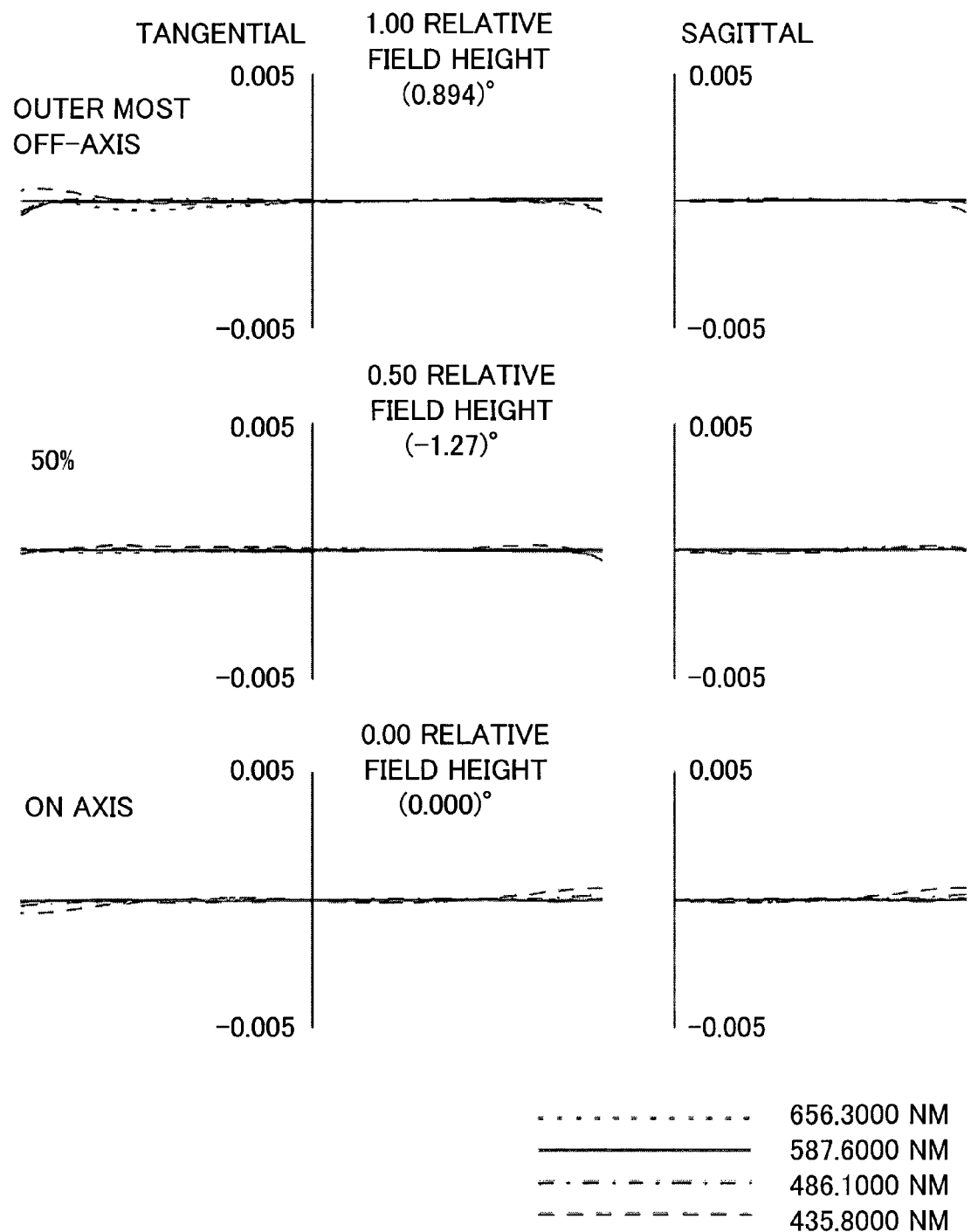
FIG. 7 is a lateral aberration diagram of the catadioptric optical system of embodiment 3 of the present invention.
Figure 8:
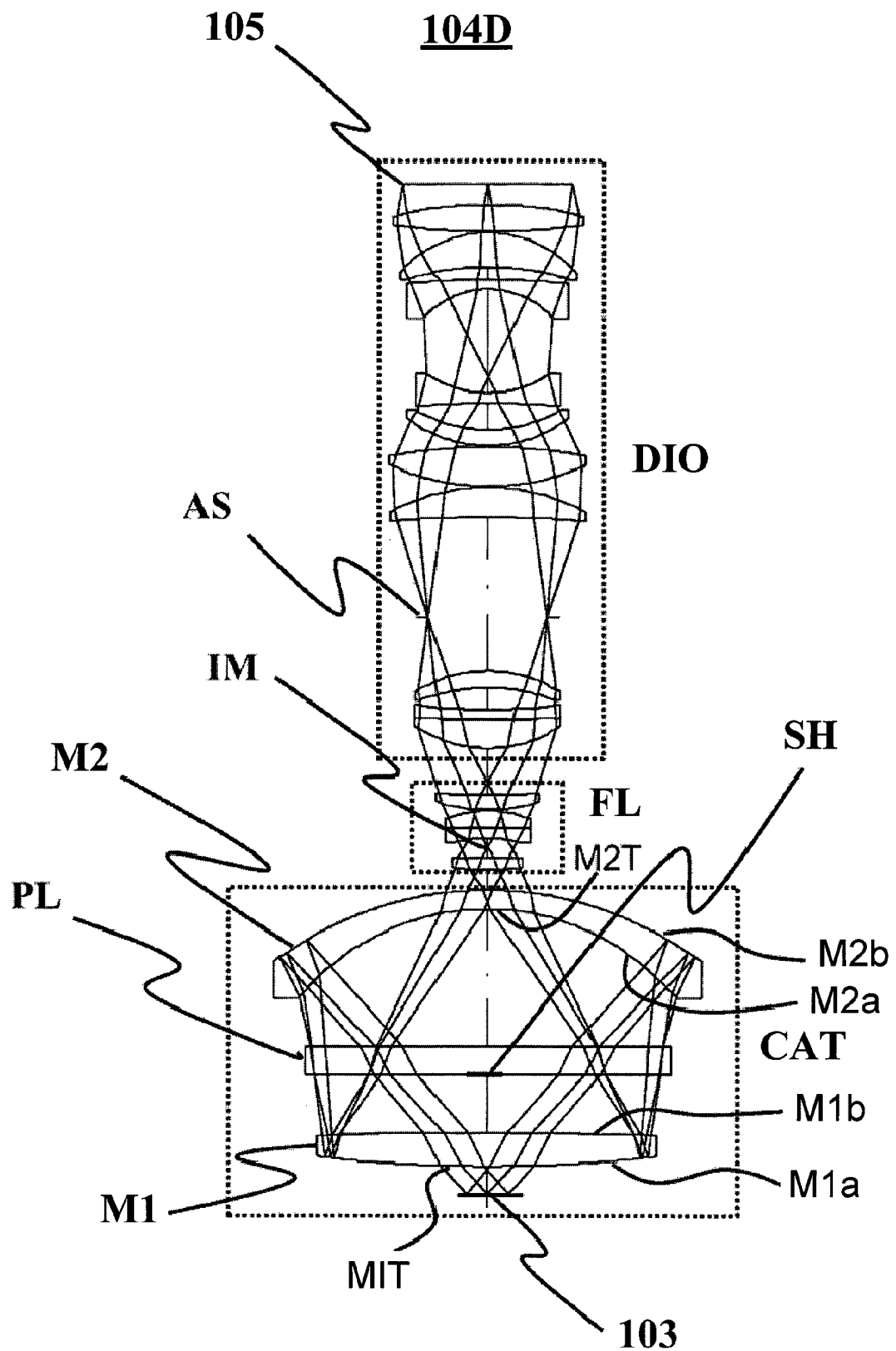
FIG. 8 is a schematic diagram of a principal part of a catadioptric optical system of embodiment 4 of the present invention.
Figure 9:
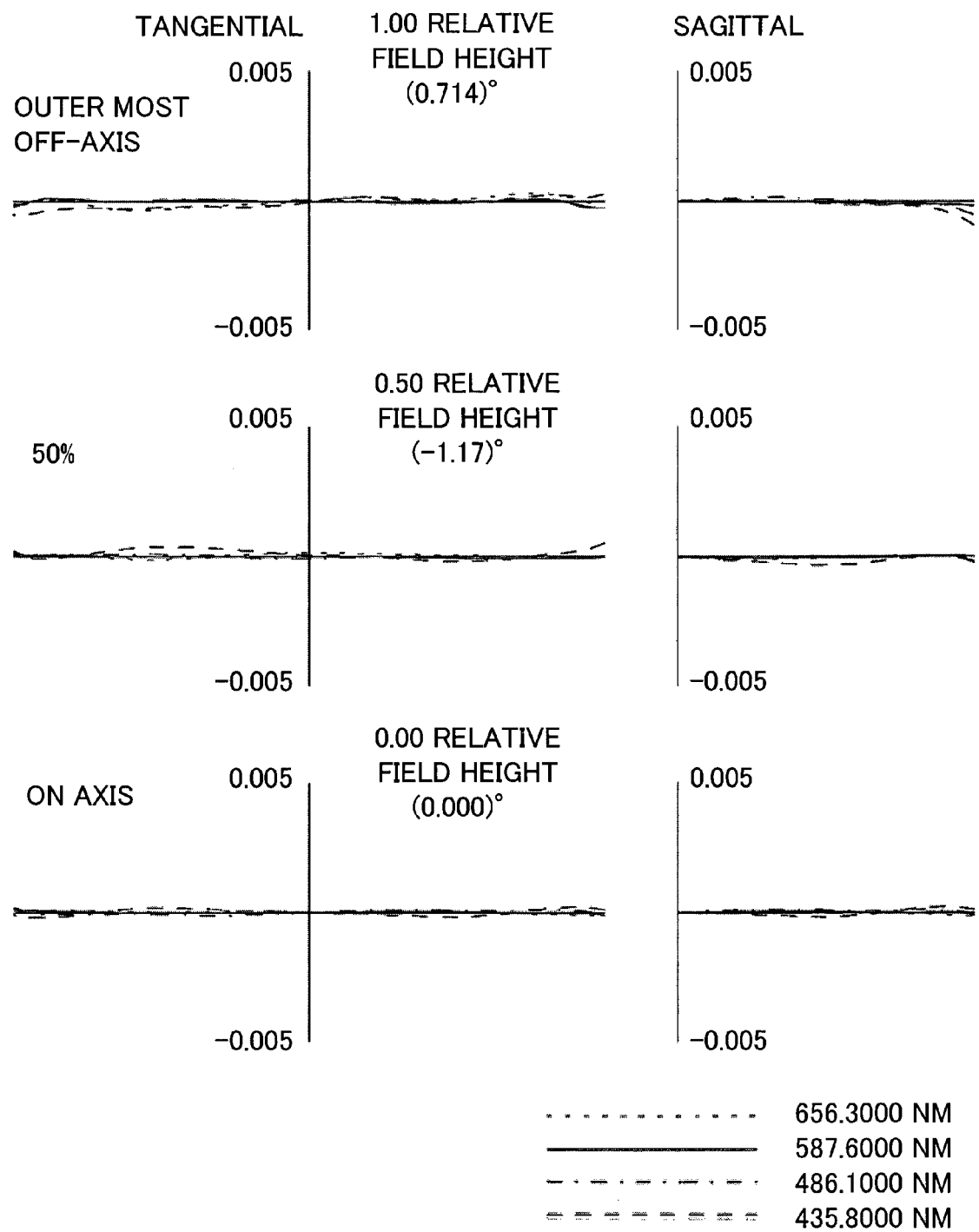
FIG. 9 is a lateral aberration diagram of the catadioptric optical system of embodiment 4 of the present invention.

FIG. 1 is a schematic sectional view of a principal part of an image pickup apparatus of the present invention. FIG. 2 is a schematic diagram of a principal part of a catadioptric optical system of embodiment 1 of the present invention. FIG. 3 is a lateral aberration diagram of the catadioptric optical system of embodiment 1 of the present invention. FIG. 4 is a schematic diagram of a principal part of a catadioptric optical system of embodiment 2 of the present invention. FIG. 5 is a lateral aberration diagram of the catadioptric optical system of embodiment 2 of the present invention. FIG. 6 is a schematic diagram of a principal part of a catadioptric optical system of embodiment 3 of the present invention. FIG. 7 is a lateral aberration diagram of the catadioptric optical system of embodiment 3 of the present invention. FIG. 8 is a schematic diagram of a principal part of a catadioptric optical system of embodiment 4 of the present invention. FIG. 9 is a lateral aberration diagram of the catadioptric optical system of embodiment 4 of the present invention.

The lateral aberration diagram illustrates a calculation result on the sample 103 expressed in millimeter units. It illustrates a wavelength of 656.3 nm, a wavelength of 486.1 nm and a wavelength of 435.8 nm in addition to a central wavelength of 587.6 nm.

Hereafter, a configuration of the image-pickup apparatus 1000 having the catadioptric optical system 104 of the present invention will be described with reference to FIG. 1. Here, FIG. 1 is a schematic sectional view of the image-pickup apparatus 1000 of the present invention. The image-pickup apparatus 1000 condenses light from the light source 101 and uniformly illuminates the sample (object) 103 using the illumination optical system 102. It uses the visible light, for example wavelengths of 400 nm-700 nm. The imaging system 104 includes a catadioptric optical system configured to form an image of the sample (object) 103 on the image-pickup element 105. The data (image information) obtained in the image-pickup element 105 is converted into image data by the image processing system 106 and the generated image data is displayed on a display 107 (display unit) or the like. The image processing system 106 corrects an aberration which cannot be corrected in the imaging system 104, or performs a processing necessary for its application, including synthesizing image data having different image-pickup positions into one image data.

The catadioptric optical system 104 in the present embodiment includes the catadioptric unit CAT, the field lens FL, and the dioptric unit DIO. The catadioptric unit CAT which configures the catadioptric optical system 104 includes at least two optical elements which include, in the order from the object side, a first optical element M1 that includes a light transmission part M1T having a convex surface M1a on the object side, a positive optical power near an optical axis, and a reflective film on a surface M1a on the object side in its periphery so as to serve as a backside reflector.

It further includes a second optical element M2 that includes a light transmission part M2T having a concave surface on the object side, a meniscus shape, a negative optical power near the optical axis, and a reflective film on a surface M2b on the image side in its periphery so as to serve as a backside reflector. The first optical element M1 and the second optical element M2 are arranged so that their backside reflectors face to each other.

The first optical element M1 includes the light transmission part M1T having a convex surface on the sample (object) 103 side, a positive optical power near the optical axis, and a backside reflector made by coating a reflective film on the surface M1a on the object side in its periphery.

The second optical element M2 has the light transmission part M2T that has a concave surface on the object (sample) 103 side, a meniscus shape, a negative optical power near the optical axis and a backside reflector made by coating a reflective film on the surface M2b on the image side in its periphery. The dioptric unit DIO shields a light flux adjacent to the optical axis among light fluxes from the sample 103 and includes a light shielding plate SH configured to prevent the light flux adjacent to the optical axis entering the image-pickup element 105.

The catadioptric optical system 104 in each embodiment is illuminated with a light flux from the illumination optical system 102, and a light flux emitted from the sample 103 passes through a central transmission part M1T of the first optical element (mangin mirror) M1. Then, it enters a refractive surface M2a of the second optical element (mangin mirror) M2, is reflected on the back surface M2b, passes through the reflective surface M2a, and enters the refractive surface M1b of the first optical element M1. Then, it is reflected on the back surface M1a of the first optical element M1, and passes through the refractive surface M1b and a central transmission part M2T of the second optical element M2, and forms the intermediate image IM of the sample 103. The intermediate image IM is formed inside a lens in the field lens FL. The intermediate image IM is enlarged and formed on the image-pickup element 105 by the dioptric unit DIO including a plurality of dioptric elements. The sample 103's image formed on the image-pickup element 105 is processed by the image processing system 106 and displayed on the display 107.

In each embodiment, vcat denotes the smallest Abbe number in Abbe numbers in materials of the first element M1 and second optical element M2 configuring the catadioptric unit. vdio denotes the smallest Abbe number in materials of a plurality of catadioptric element in the dioptric unit DIO. The following condition is satisfied:

$$\nu dio < \nu cat \quad (1)$$

In each embodiment, at least one of the following conditions may be satisfied.

The Abbe number vcat and Abbe number vdio may satisfy at least one of the following conditions:

$$45 < \nu cat \quad (2)$$

$$\nu dio < 40 \quad (3)$$

Assume that RM2a and RM2b denote respectively curvature radiuses of the surfaces M2a and M2b on the object and image sides of the second optical element M2, t denotes a thickness on the optical axis of the second optical element M2, and Nd denotes a refractive index of the material of the second optical element M2 for the wavelength of 587.6 nm.

[Expression 1]

$$\frac{1}{\left(\frac{|RM2b|}{2}\right)} - \frac{1}{(|RM2a|+t)} = \frac{1}{s'} \quad (a1)$$

$$\frac{(s'-t) \times Nd}{(Nd+1)} = Rapl \quad (a2)$$

When the above expressions are assumed, the following condition may be satisfied:

$$Rapl \times 0.8 < |RM2a| < Rapl \times 1.2 \quad (4)$$

Moreover, d denotes a distance on the optical axis from a surface where the backside reflector M1b is formed in the first optical element M1 to a surface where the backside reflector M2b is formed in the second optical element M2. L denotes a distance (overall length) from a position where the object is disposed to the image surface. The following condition is satisfied:

$$L/d < 4.5 \quad (5)$$

The conditional expression (1) is to achieve a high optical performance in the visible light range. When the conditional expression (1) is not satisfied, it becomes difficult to correct aberrations well in the entire visible light range while a high resolution is maintained in a wide image-pickup region and the high optical performance is achieved.

The conditional expressions (2) and (3) are to correct a secondary chromatic aberration well. When these conditional expressions are not satisfied, the correction of the secondary chromatic aberration becomes difficult and therefore it is undesirable.

The conditional expression (4) is to provide a strong negative refractive power in the surface M2a of the object side in the second optical element M2 and to reduce the aberration in the wide wavelength region.

The expression (a1) is an expression that determines an imaging relationship to the reflective surface M2b and represents that the object point is located at the center of curvature of the refractive surface M2a and the image point is located at a position distant by a distance S' from the reflective surface M2b. The expression (a2) denotes a curvature radius Rapl for the refractive surface M2a to satisfy an aplanatic condition with respect to the object point of a virtual image located at a position distant by the distant S' from the reflective surface M2b. The conditional expression (4) denotes how far the refractive surface M2a is allowed to come off the curvature radius Rapl that satisfies the aplanatic condition. A certain extent in the conditional expression (4) is necessary for balanced aberrations in other surfaces, and the conditional expression (4) may be satisfied for balancing with the first optical element M1.

In each embodiment, when the three expressions (a1), (a2) and (4) are satisfied, the aberration in the refractive surface M2a can be reduced as follows.

A light ray initially enters the refractive surface M2a at nearly the 0 degree.

When a light ray reflected by the reflective surface M2b is emitted from the refractive surface M2a, the radius of curvature of the refractive surface M2 satisfies the aplanatic condition.

In each embodiment, it becomes easy to reduce the aberration in the wide wavelength region by reducing the aberration in the refractive surface M2a having the largest effective radius.

The conditional expression (5) is necessary to miniaturize the overall system. When the conditional expression (5) is not satisfied, it becomes difficult to maintain low a ratio of an obscuration of the light flux (a ratio of the unused light flux) in the catadioptric optical system while shortening the overall length (a distance on the optical axis from the object surface to the image surface).

Values of the conditional expression (2), (3), (4), and (5) may be set as follows:

$$50 < \nu cat \quad (2a)$$

$$\nu dio < 35 \quad (3a)$$

$$Rapl \times 0.8 < |RM2a| < Rapl \quad (4a)$$

$$L/d < 4.0 \quad (5a)$$

Next, the catadioptric optical system according to each embodiment of the present invention will be described. FIG. 2 is a sectional view of a principal part of a catadioptric optical system of embodiment 1 of the imaging system (catadioptric optical system) 104 in FIG. 1. In FIG. 2, the imaging system (catadioptric optical system) 104 is labeled as 104A.

In FIG. 2, 104A (104B-104D in other embodiments described below) denotes a catadioptric optical system. The catadioptric optical system 104A includes a catadioptric unit CAT including reflective surfaces and refractive surfaces configured to condense light fluxes from the sample (object) 103 and to form the intermediate image IM on a predetermined surface, and the field lens unit FL configured to condense light fluxes from the intermediate image IM and to introduce the light to the dioptric unit DIO described below. It further includes the dioptric unit DIO including a refractive surface that forms the intermediate image IM on the image-pickup element (image surface) and an aperture stop AS.

The catadioptric unit CAT includes the first and second optical elements M1 and M2, each of which has a light transmission part near (or around) the optical axis and a reflective film made, for example, of aluminum, silver or the like, on one surface of a periphery so as to serve as the backside reflector. Here, the first and second optical elements M1 and M2 are so-called mangin mirrors.

The first optical element M1 includes the light transmission part M1T which has a convex surface on the sample (object) 103 side and has a positive refractive power near the optical axis, and a backside reflective part coated with the reflective film on a surface M1a of the object side in the periphery. The second optical element M2 includes the light transmission part M2T which has a concave surface on the sample (object) side, a meniscus shape, a negative refractive power near the optical axis, and a backside reflector coated with the reflective film on the surface M2b on an image side in the periphery. SH denotes a light shielding plate, and it shields a light flux near the optical axis among light fluxes from the sample 103 and prevents the light from entering the image-pickup element 105 near the optical axis. The light-shielding plate SH is disposed on or near the aperture stop AS.

The catadioptric optical system 104A represented in FIG. 2 is illuminated with light fluxes from the illumination optical system 102 and light fluxes emitted from the sample 103 pass through the central transmission part M1T of the first optical element (mangin mirror) M1. Then, the light fluxes enter the refractive surface M2a of the second optical element (mangin mirror) M2, are reflected on the back surface M2b, pass through the reflective surface M2a, and enter the refractive surface M1b of the first optical element M1. Then, the light fluxes are reflected on the back surface M1a of the first optical element M1, pass through the refractive surface M1b and the central transmission part M2T of the second optical element M2 to the field lens side, and form the intermediate image IM of the sample 103. The intermediate image IM is formed inside a lens in the field lens FL. The intermediate image IM is enlarged and formed on the image-pickup element 105 by the dioptric unit DIO including the plurality of dioptric elements. The image of the sample 103 formed on the image-pickup element 105 is processed by the image processing system 106 and displayed on the display 107.

The present embodiment corrects a spherical aberration well without causing a chromatic aberration by making aspherical the backside reflective surfaces M1a and M2b of the first and second optical elements M1 and M2, which are two mangin mirrors. Moreover, it provides a strong diverging effect to the refractive surface M2a of the second optical element M2, thereby providing the following optical effect.

The light transmission part near the center of the first optical element M1 having a positive lens effect can be made smaller than the effective diameter.

Since the axial chromatic aberrations of the catadioptric unit CAT and the dioptric unit DIO can be counterbalanced, a convex lens power (refractive power of a positive lens) of the dioptric unit DIO can be strengthened and the overall length can be easily made smaller.

In this case, the secondary chromatic aberration can be reduced by using a glass material for the catadioptric unit CAT which has a lower dispersion than that of a positive lens of the dioptric unit DIO.

In a normal dioptric system, a power of a positive lens is made stronger than that of a negative lens to form an image. Therefore, the chromatic aberration is corrected by using a low-dispersion glass material having the low dispersion for the positive lens and a high-dispersion glass material for the negative lens. In this case, the glass materials of the low dispersion and the high dispersion exhibit different rates of refractive-index change for a wavelength and cause the secondary chromatic aberration.

On the other hand, even if a (refractive) power of the negative refractive surface M2a of the catadioptric unit CAT is made larger, the catadioptric optical system 104A in the present embodiment can form an image by strengthening a power in the reflective surface M2b that causes no chromatic aberration. Therefore, the secondary chromatic aberration can be reduced by using a glass material having a low dispersion (having a large Abbe number) for the glass material of the catadioptric unit CAT. The catadioptric unit CAT has poor off-axis aberration correction performance. Accordingly, in order to obtain a wide observation region, the present embodiment corrects the off-axial chromatic aberration to obtain the wide observation region by using a glass material having a high dispersion (having a small Abbe number) for a part of the dioptric unit DIO. It further reduces the off-axial chromatic aberration by disposing the field lens FL adjacent to the intermediate image IM.

In this case, by satisfying the above-mentioned conditional expression (1), the aberrations can be corrected well in entire visible light range while the high resolution is maintained in the wide region.

Embodiment 1

This embodiment provides a light condensing effect to the reflective surface M1a of the first optical element M1 and the reflective surface M2b of the second optical element M2 in the catadioptric unit CAT. Therefore, even if the overall length is shortened by strengthening the power of the dioptric unit DIO, the Petzval sum can be easily improved. This is because the Petzval sum acts oppositely between the reflective and refractive surfaces. Moreover, the interval between the two reflective surfaces M1a and M2b should be separated to some extent in order to make the central transmission parts of the first and second optical elements M1 and M2 smaller than the effective diameter. In this case, if the interval d between the two reflective surfaces M1a and M2b and the overall length L satisfy the above-mentioned conditional expression (2), a ratio of an obscuration can be reduced while the overall length is maintained small.

In the catadioptric optical system of embodiment 1, the numeric aperture NA of the object side is 0.7, the imaging magnification is 4 times, and the object height of the sample 103 is ϕ20 mm. The object 103 side is configured telecentric and the ratio of the obscuration in the pupil is reduced down to twenty percent or lower in a surface ratio. The worst value of the wavefront aberration for white light is reduced down to 100 mλ (rms) or lower.

Embodiment 2

FIG. 4 is a sectional view of a principal part of a catadioptric optical system 104B according to embodiment 2 of the present invention. Those elements in FIG. 4, which are corresponding elements in FIG. 2, are designated by the same reference numerals. The configuration of embodiment 2 is nearly the same as that of embodiment 1. Embodiment 2 differs from embodiment 1 in that the intermediate image IM is formed near a joint surface of a cemented lens in the field lens FL.

In the catadioptric optical system of embodiment 2, the numeric aperture NA of the object side is 0.7, the imaging magnification is 4 times, and the object height of the sample 103 is ϕ20 mm. Both the objection side and the image side are configured telecentric, unlike embodiment 1, and the ratio of the obscuration in the pupil is reduced down to twenty percent or lower in a surface ratio. The worst value of the wavefront aberration for white light is down reduced to 50 mλ (rms) or lower.

Embodiment 3

FIG. 6 is a sectional view of a principal part of a catadioptric optical system 104C according to embodiment 3 of the present invention. Those elements in FIG. 6, which are corresponding elements in FIG. 2, are designated by the same reference numerals. The configuration of embodiment 3 is nearly the same as that of embodiment 1. Embodiment 3 differs from embodiment 1 in that the intermediate image IM is formed on a refractive surface of a lens in the field lens FL.

In the catadioptric optical system of embodiment 3, the numeric aperture NA of the object side is 0.7, the imaging magnification is 6 times, and the object height of the sample 103 is ϕ17.5 mm. Both the object side and the image side are configured telecentric and the ratio of the obscuration in the pupil is reduced down to twenty percent or lower in a surface ratio. The worst value of the wavefront aberration for white light is reduced down to 50 mλ (rms) or lower.

Embodiment 4

FIG. 8 is a sectional view of a principal part of a catadioptric optical system 104D according to embodiment 4 of the present invention. Those elements in FIG. 8, which are corresponding elements in FIG. 2, are designated by the same reference numerals. Embodiment 4 differs from embodiment 1 in a configuration of the catadioptric unit CAT. Embodiment 4 differs from embodiment 1 in that a plane-parallel plate PL is provided between the first and second optical element M1 and M2 in the catadioptric unit CAT.

The light flux from the sample 103 twice passes through the plane-parallel plate PL and is emitted to the field lens FL side.

This embodiment shields the light flux near the optical axis before the light reaches the dioptric unit DIO by disposing the light shielding plate SH at the center of the plane-parallel plate PL. Therefore, unnecessary light generated inside the dioptric unit DIO can be reduced.

Moreover, the plane-parallel plate PL includes a tilting unit and therefore it is possible to adjust a coma aberration generated by the eccentricity of the lens in the assembling.

Furthermore, embodiment 4 differs from embodiment 1 in that the intermediate image IM is formed between lenses which configure the field lens FL.

In the imaging system of embodiment 4, the numeric aperture NA of the object side is 0.7, the imaging magnification is 4 times, and the object height is φ20 mm. Both the object side and the image side are configured telecentric and the ratio of obscuration is reduced down to twenty percent or lower in a surface ratio. The worst value of the wavefront aberration for white light is reduced down to 50 mλ (rms) or lower.

While the present invention has been described with reference to exemplary embodiments, it is to be understood that the invention is not limited to these embodiments, and it can be diversely deformed and modified within the extent of gist. For example, the present invention is applicable to both an image-pickup apparatus configured to scan a large screen and an image-pickup apparatus that is not a scanner.

Hereafter, numerical examples of each embodiment will be described. A surface number denotes an order of an optical surface from the object surface (sample surface) to the image surface. r denotes a radius of curvature of an i-th optical surface. d denotes an interval between the i-th optical surface and the i+1-th optical surface. A positive sign is set to a measurement from the object side to the image side (as the light travels) and a negative sign is set to the opposite direction.

Nd and νd respectively denote a refraction index and an Abbe number of a material for the wavelength of 587.6 nm.

The shape of an aspheric surface is represented as a general aspheric surface shown as the following formula. In the following formula, Z denotes a coordinate in the optical axis direction, c denotes a curvature (inverse of the radius of curvature r), h denotes a height from the optical axis, k denotes a constant of the cone, and a, b, c, d, e, f, g, h, i . . . respectively denote aspheric coefficients of the fourth order, the sixth order, the eighth order, the tenth order, the twelfth order, the fourteenth order, the sixteenth order, the eighteenth order, the twentieth order . . . .

[Expression 2]
$$Z = \frac{ch^2}{1 + \sqrt{(1+k)c^2h^2}} + ah^4 + bh^6 + ch^8 + dh^{10} + eh^{12} + fh^{14} + gh^{16} + hh^{18} + ih^{20} + \ldots$$

"E-X" denotes "$10^{-X}$". Table 5 summarizes a relationship between each above-mentioned conditional expression and the following numerical example.

Numerical Example 1

νcat = 58.90
νdio = 27.58
L/d = 3.65
Rapl = 146.43

| Surface No. | r | d | Nd | νd |
|---|---|---|---|---|
| Object surface | 13.39 | | | |
| 1 | 906.36 | 17.06 | 1.52 | 58.90 |
| 2 | −3997.78 | 110.10 | | |
| 3 | −126.68 | 9.90 | 1.52 | 58.90 |
| 4 | −177.35 | −9.90 | 1.52 | 58.90 |
| 5 | −126.68 | −110.10 | | |
| 6 | −3997.78 | −17.06 | 1.52 | 58.90 |
| 7 | 906.36 | 17.06 | 1.52 | 58.90 |
| 8 | −3997.78 | 110.10 | | |
| 9 | −126.68 | 9.90 | 1.52 | 58.90 |
| 10 | −177.35 | 10.00 | | |
| 11 | 201.21 | 7.93 | 1.49 | 70.40 |
| 12 | −66.18 | 3.03 | | |
| 13 | −48.21 | 5.11 | 1.76 | 27.58 |
| 14 | −62.18 | 10.24 | | |
| 15 | 225.57 | 11.90 | 1.62 | 60.32 |
| 16 | −72.13 | 10.13 | | |
| 17 | −52.69 | 5.00 | 1.68 | 31.65 |
| 18 | −99.47 | 0.50 | | |
| 19 | 87.94 | 11.85 | 1.62 | 60.32 |
| 20 | 26624.84 | 26.26 | | |
| 21 | 186.16 | 11.47 | 1.74 | 43.26 |
| 22 | −153.01 | 21.01 | | |
| 23 | Stop | 70.00 | | |
| 24 | 165.44 | 17.86 | 1.62 | 60.34 |
| 25 | −287.50 | 0.50 | | |
| 26 | 114.40 | 17.33 | 1.74 | 44.86 |
| 27 | −523.65 | 7.90 | | |
| 28 | −151.69 | 5.00 | 1.63 | 35.31 |
| 29 | −2579.73 | 47.14 | | |
| 30 | −41.07 | 6.44 | 1.76 | 27.58 |
| 31 | −94.38 | 7.81 | | |
| 32 | −50.16 | 15.84 | 1.64 | 46.53 |
| 33 | −36.60 | 8.81 | 1.74 | 44.85 |
| 34 | −72.23 | 10.50 | | |
| Image surface | | | | |

TABLE 1

Aspheric coefficient

| Surface No. | k | a | b | c |
|---|---|---|---|---|
| 1, 7 | 0.00E+00 | 4.53E−09 | 9.23E−14 | 6.79E−18 |
| 4, 10 | 0.00E+00 | 3.81E−09 | 1.60E−13 | 5.83E−18 |
| 22 | 0.00E+00 | 4.42E−07 | 2.82E−11 | 2.17E−14 |
| 25 | 0.00E+00 | −2.29E−07 | 2.22E−11 | 8.97E−15 |
| 29 | 0.00E+00 | 5.70E−07 | −1.67E−10 | −3.30E−14 |
| 30 | 0.00E+00 | 2.45E−06 | 4.62E−10 | 6.15E−13 |

| Surface No. | d | e | f | g |
|---|---|---|---|---|
| 1, 7 | 1.53E−21 | −2.53E−25 | 2.28E−29 | −7.53E−34 |
| 4, 10 | 8.48E−23 | 1.83E−26 | −6.46E−31 | 3.14E−35 |
| 22 | −1.14E−17 | 3.32E−21 | 0.00E+00 | 0.00E+00 |
| 25 | −3.08E−18 | 3.19E−22 | 0.00E+00 | 0.00E+00 |
| 29 | 1.29E−17 | −1.42E−21 | 0.00E+00 | 0.00E+00 |
| 30 | −3.59E−16 | 3.36E−19 | 0.00E+00 | 0.00E+00 |

Numerical Example 2

| | |
|---|---|
| νcat = 70.24 | |
| νdio = 25.43 | |
| L/d = 3.81 | |
| Rapl = 147.19 | |

| Surface No. | r | d | Nd | νd |
|---|---|---|---|---|
| Object surface | | 13.39 | | |
| 1 | 736.61 | 24.08 | 1.49 | 70.24 |
| 2 | −9661.75 | 97.67 | | |
| 3 | −118.31 | 9.38 | 1.49 | 70.24 |
| 4 | −170.29 | −9.38 | 1.49 | 70.24 |
| 5 | −118.31 | −97.67 | | |
| 6 | −9661.75 | −24.08 | 1.49 | 70.24 |
| 7 | 736.61 | 24.08 | 1.49 | 70.24 |
| 8 | −9661.75 | 97.67 | | |
| 9 | −118.31 | 9.38 | 1.49 | 70.24 |
| 10 | −170.29 | 10.00 | | |
| 11 | −458.41 | 5.89 | 1.64 | 58.37 |
| 12 | −119.83 | 3.29 | | |
| 13 | −54.79 | 5.00 | 1.65 | 33.79 |
| 14 | −998.82 | 11.55 | 1.62 | 60.25 |
| 15 | −54.52 | 0.73 | | |
| 16 | 79.77 | 7.04 | 1.62 | 60.29 |
| 17 | 483.74 | 34.05 | | |
| 18 | 59.02 | 11.53 | 1.76 | 40.10 |
| 19 | 109.31 | 0.50 | | |
| 20 | 65.70 | 20.52 | 1.49 | 70.35 |
| 21 | −118.81 | 26.00 | | |
| 22 | Stop | 18.84 | | |
| 23 | −49.26 | 33.31 | 1.81 | 25.43 |
| 24 | −79.27 | 0.50 | | |
| 25 | 122.53 | 26.67 | 1.64 | 55.38 |
| 26 | −86.46 | 0.50 | | |
| 27 | 57.90 | 15.51 | 1.49 | 70.35 |
| 28 | 78.67 | 17.39 | | |
| 29 | −124.44 | 5.74 | 1.57 | 42.86 |
| 30 | 58.49 | 15.64 | | |
| 31 | −147.56 | 8.96 | 1.76 | 47.82 |
| 32 | −75.81 | 11.90 | | |
| 33 | −59.72 | 8.10 | 1.60 | 38.03 |
| 34 | 272.55 | 9.12 | | |
| 35 | −178.62 | 19.27 | 1.72 | 34.72 |
| 36 | −68.40 | 0.50 | | |
| 37 | 1362.89 | 16.90 | 1.51 | 60.49 |
| 38 | −142.77 | 10.50 | | |
| Image surface | | | | |

TABLE 2

Aspheric coefficient

| Surface No. | k | a | b | c |
|---|---|---|---|---|
| 1, 7 | 0.00E+00 | 6.72E−09 | 6.14E−14 | 2.27E−17 |
| 4, 10 | 0.00E+00 | 5.58E−09 | 2.43E−13 | 9.28E−18 |
| 17 | 0.00E+00 | 6.69E−07 | −6.19E−11 | 3.77E−14 |
| 19 | 0.00E+00 | 9.53E−07 | 2.89E−10 | 2.54E−14 |
| 26 | 0.00E+00 | 4.94E−07 | 1.25E−11 | 2.56E−15 |
| 30 | 0.00E+00 | 1.32E−06 | 1.83E−10 | −1.01E−13 |
| 38 | 0.00E+00 | −6.34E−07 | 9.02E−12 | −3.52E−14 |

| Surface No. | d | e | f | g |
|---|---|---|---|---|
| 1, 7 | −9.74E−22 | 1.18E−25 | −5.31E−30 | 2.75E−34 |
| 4, 10 | 1.61E−22 | 2.65E−26 | −9.34E−31 | 5.28E−35 |
| 17 | −1.71E−16 | 1.20E−19 | 0.00E+00 | 0.00E+00 |
| 19 | −5.14E−18 | 5.40E−21 | 0.00E+00 | 0.00E+00 |
| 26 | −9.15E−19 | 1.58E−22 | 0.00E+00 | 0.00E+00 |
| 30 | −2.77E−18 | −2.19E−21 | 0.00E+00 | 0.00E+00 |
| 38 | 9.31E−18 | −1.34E−21 | 0.00E+00 | 0.00E+00 |

Numerical Example 3

| | |
|---|---|
| νcat = 52.43 | |
| νdio = 27.58 | |
| L/d = 3.33 | |
| Rapl = 157.37 | |

| Surface No. | r | d | Nd | νd |
|---|---|---|---|---|
| Object surface | | 15.87 | | |
| 1 | 754.25 | 22.79 | 1.52 | 58.90 |
| 2 | 3256.39 | 116.10 | | |
| 3 | −153.11 | 11.11 | 1.52 | 52.43 |
| 4 | −204.85 | −11.11 | 1.52 | 52.43 |
| 5 | −153.11 | −116.10 | | |
| 6 | 3256.39 | −22.79 | 1.52 | 58.90 |
| 7 | 754.25 | 22.79 | 1.52 | 58.90 |
| 8 | 3256.39 | 116.10 | | |
| 9 | −153.11 | 11.11 | 1.52 | 52.43 |
| 10 | −204.85 | 10.00 | | |
| 11 | 122.17 | 5.52 | 1.74 | 44.85 |
| 12 | 339.11 | 3.40 | | |
| 13 | −68.55 | 5.00 | 1.72 | 29.36 |
| 14 | 98.91 | 8.26 | 1.63 | 59.19 |
| 15 | −51.33 | 0.50 | | |
| 16 | 56.66 | 8.68 | 1.67 | 52.17 |
| 17 | 143.94 | 16.52 | | |
| 18 | 59.18 | 15.25 | 1.68 | 51.06 |
| 19 | −110.80 | 1.81 | | |
| 20 | 3064.28 | 5.83 | 1.76 | 27.58 |
| 21 | −292.44 | 20.31 | | |
| 22 | Stop | 17.44 | | |
| 23 | −37.08 | 6.62 | 1.53 | 50.87 |
| 24 | 3195.60 | 3.24 | | |
| 25 | −523.22 | 14.72 | 1.75 | 34.78 |
| 26 | −62.19 | 0.50 | | |
| 27 | −2164.72 | 20.45 | 1.54 | 65.27 |
| 28 | −62.64 | 0.50 | | |
| 29 | 70.84 | 18.40 | 1.74 | 44.85 |
| 30 | −646.36 | 9.39 | | |
| 31 | −208.25 | 5.00 | 1.74 | 28.07 |
| 32 | 74.90 | 15.63 | | |
| 33 | −66.07 | 7.40 | 1.75 | 30.36 |
| 34 | −53.61 | 15.34 | | |
| 35 | −42.41 | 5.00 | 1.57 | 63.50 |
| 36 | 34891.48 | 9.86 | | |
| 37 | −60.56 | 5.00 | 1.67 | 33.89 |
| 38 | −1135.42 | 14.80 | | |
| 39 | −160.27 | 31.79 | 1.74 | 44.85 |
| 40 | −74.15 | 0.50 | | |
| 41 | 478.58 | 18.46 | 1.63 | 59.36 |
| 42 | −221.25 | 13.00 | | |
| Image surface | | | | |

TABLE 3

Aspheric coefficient

| Surface No. | k | a | b | c |
|---|---|---|---|---|
| 1, 7 | 0.00E+00 | 2.71E−09 | −2.26E−14 | 1.08E−17 |
| 4, 10 | 0.00E+00 | 3.18E−09 | 9.29E−14 | 2.40E−18 |
| 19 | 0.00E+00 | 2.08E−06 | 3.94E−10 | −2.86E−13 |
| 23 | 0.00E+00 | 3.44E−07 | 7.59E−10 | 2.58E−13 |
| 28 | 0.00E+00 | 9.57E−08 | 1.47E−10 | 5.01E−14 |
| 34 | 0.00E+00 | 1.16E−06 | −1.81E−11 | 8.21E−15 |
| 44 | 0.00E+00 | −3.72E−07 | 2.92E−11 | −1.73E−15 |

| Surface No. | d | e | f | g |
|---|---|---|---|---|
| 1, 7 | −6.02E−22 | 3.69E−26 | −1.27E−30 | 2.65E−35 |
| 4, 10 | 5.30E−23 | 2.78E−27 | −6.10E−32 | 3.89E−36 |
| 19 | −4.35E−16 | 4.86E−21 | 0.00E+00 | 0.00E+00 |
| 23 | −1.08E−16 | 1.59E−19 | 0.00E+00 | 0.00E+00 |
| 28 | 9.02E−18 | 6.69E−21 | 0.00E+00 | 0.00E+00 |
| 34 | 2.75E−17 | −4.75E−20 | 0.00E+00 | 0.00E+00 |
| 44 | −2.06E−19 | 3.79E−23 | 0.00E+00 | 0.00E+00 |

Numerical Example 4

| | vcat = 52.43 | | | |
|---|---|---|---|---|
| | vdio = 27.58 | | | |
| | L/d = 3.65 | | | |
| | Rapl = 145.96 | | | |

| Surface No. | r | d | Nd | vd |
|---|---|---|---|---|
| Object surface | 13.39 | | | |
| 1 | 819.00 | 16.40 | 1.49 | 70.24 |
| 2 | −3201.41 | 28.35 | | |
| 3 | ∞ | 13.97 | 1.49 | 70.24 |
| 4 | ∞ | 68.55 | | |
| 5 | −122.05 | 9.54 | 1.52 | 52.43 |
| 6 | −172.82 | −9.54 | 1.52 | 52.43 |
| 7 | −122.05 | −68.55 | | |
| 8 | ∞ | −13.97 | 1.49 | 70.24 |
| 9 | ∞ | −28.35 | | |
| 10 | −3201.41 | −16.40 | 1.49 | 70.24 |
| 11 | 819.00 | 16.40 | 1.49 | 70.24 |
| 12 | −3201.41 | 28.35 | | |
| 13 | ∞ | 13.97 | 1.49 | 70.24 |
| 14 | ∞ | 68.55 | | |
| 15 | −122.05 | 9.54 | 1.52 | 52.43 |
| 16 | −172.82 | 10.00 | | |
| 17 | 126.58 | 6.22 | 1.74 | 44.85 |
| 18 | −950.12 | 9.32 | | |
| 19 | −64.86 | 5.00 | 1.68 | 31.36 |
| 20 | 537.54 | 8.74 | 1.62 | 60.32 |
| 21 | −56.79 | 0.50 | | |
| 22 | 82.22 | 7.50 | 1.49 | 70.41 |
| 23 | 635.34 | 23.00 | | |
| 24 | 64.84 | 14.27 | 1.69 | 49.87 |
| 25 | 618.89 | 5.01 | 1.76 | 27.58 |
| 26 | 709.49 | 10.48 | | |
| 27 | −96.82 | 8.38 | 1.75 | 34.46 |
| 28 | −68.50 | 28.14 | | |
| 29 | Stop | 48.00 | | |
| 30 | −577.36 | 14.75 | 1.74 | 44.85 |
| 31 | −104.66 | 0.50 | | |
| 32 | 116.63 | 19.70 | 1.74 | 44.85 |
| 33 | −222.26 | 0.50 | | |
| 34 | 65.69 | 7.94 | 1.76 | 27.58 |
| 35 | 70.78 | 13.16 | | |
| 36 | −483.66 | 5.00 | 1.74 | 28.39 |
| 37 | 53.97 | 51.45 | | |
| 38 | −43.90 | 5.00 | 1.62 | 36.83 |
| 39 | −429.14 | 6.13 | | |
| 40 | −138.53 | 17.04 | 1.74 | 44.50 |
| 41 | −58.87 | 0.50 | | |
| 42 | 357.86 | 13.06 | 1.74 | 44.85 |
| 43 | −313.15 | 10.50 | | |
| Image surface | | | | |

TABLE 4

Aspheric coefficient

| Surface No. | k | a | b | c |
|---|---|---|---|---|
| 1, 11 | 0.00E+00 | 7.19E−09 | −2.15E−14 | 3.31E−17 |
| 6, 16 | 0.00E+00 | 5.09E−09 | 2.20E−13 | 8.31E−18 |
| 23 | 0.00E+00 | 1.03E−06 | 1.79E−11 | −3.63E−14 |
| 26 | 0.00E+00 | 7.92E−07 | 2.89E−10 | 1.07E−14 |
| 33 | 0.00E+00 | 1.89E−07 | −4.72E−12 | −2.07E−16 |
| 37 | 0.00E+00 | 2.31E−07 | −2.63E−11 | −2.63E−14 |
| 43 | 0.00E+00 | −5.54E−07 | 1.02E−10 | −2.53E−14 |

| Surface No. | d | e | f | g |
|---|---|---|---|---|
| 1, 11 | −2.42E−21 | 2.45E−25 | −1.36E−29 | 4.52E−34 |
| 6, 16 | 2.05E−22 | 1.85E−26 | −4.31E−31 | 3.56E−35 |
| 23 | 3.77E−17 | 1.29E−20 | 0.00E+00 | 0.00E+00 |
| 26 | −1.21E−17 | 2.23E−21 | 0.00E+00 | 0.00E+00 |
| 33 | −9.83E−20 | 3.27E−23 | 0.00E+00 | 0.00E+00 |
| 37 | 2.69E−17 | −9.30E−21 | 0.00E+00 | 0.00E+00 |
| 43 | 8.33E−19 | 3.66E−22 | 0.00E+00 | 0.00E+00 |

TABLE 5

| Conditional expression | Embodiments | | | |
|---|---|---|---|---|
| | 1 | 2 | 3 | 4 |
| (2) vcat | 58.9 | 70.24 | 52.43 | 52.43 |
| (3) vdio | 27.58 | 25.43 | 27.58 | 27.58 |
| (4) Rapl | 146.43 | 147.19 | 157.37 | 145.96 |
| RM2a | −126.68 | −118.31 | −153.11 | −122.05 |
| (5) L/d | 3.65 | 3.81 | 3.33 | 3.65 |

INDUSTRIAL APPLICABILITY

The catadioptric optical system is suitable for enlarging an object to observe.

This application claims the benefit of Japanese Patent Application No. 2010-103612, filed on Apr. 28, 2010, which is hereby incorporated by reference herein in its entirety.

The invention claimed is:

1. A catadioptric optical system comprising:
 a catadioptric unit configured to form an intermediate image of an object;
 a field lens disposed at a position where the intermediate image is formed; and
 a dioptric unit configured to form an image of the intermediate image, the dioptric unit including a plurality of dioptric optical elements,
 wherein the catadioptric unit includes:
 a first optical element including a first light transmission part having a convex surface on an object side, a positive refractive power near an optical axis, and a first backside reflector having a first reflective film on a surface on the object side in a periphery; and
 a second optical element including a second light transmission part having a concave surface on the object side, a meniscus shape, a negative refractive power near the optical axis, and a second backside reflector having a second reflective film on a surface on an image side,
 wherein the light flux from the object passes through the first light transmission part, the second backside reflector, the first backside reflector, and the second light transmission part in this order, and is emitted to a field lens side, and
 wherein the following condition is satisfied:

$$vdio < vcat,$$

where vcat denotes a smallest Abbe number in Abbe numbers of materials of the first and second optical elements, and vdio denotes a smallest Abbe number in Abbe numbers of materials of the plurality of dioptric optical elements.

2. The catadioptric optical system according to claim 1, wherein the Abbe number vcat satisfies the following condition:

$$45 < vcat.$$

3. The catadioptric optical system according to claim 1, wherein the Abbe number vdio satisfies the following condition:

$$vdio < 40.$$

4. The catadioptric optical system according to claim 1, wherein the following conditions are satisfied:

$$\frac{1}{\left(\frac{|RM2b|}{2}\right)} - \frac{1}{(|RM2a|+t)} = \frac{1}{s},$$

-continued $$\frac{(s'-t) \times Nd}{(Nd+1)} = Rapl$$

$$Rapl \times 0.8 < |RM2a| < Rapl \times 1.2,$$

where RM2*a* and RM2*b* respectively denote radiuses of curvature of surfaces of the object side and the image side in the second optical element, t denotes a thickness on the optical axis of the second optical element, and Nd denotes a refractive index of a material of the second optical element for a wavelength of 587.6 nm.

5. The catadioptric optical system according to claim 1, wherein the following condition is satisfied:

$$L/d < 4.5,$$

where d denotes a distance on the optical axis from a surface where the backside reflector of the first optical element is formed to a surface where the backside reflector of the second optical element is formed, and L denotes a distance from a position where the object is disposed to the image surface.

6. An image-pickup apparatus comprising:
a light source unit;
an illumination optical system configured to illuminate an object with light fluxes from the light source unit;
a catadioptric optical system configured to form an image of the object;
an image-pickup element configured to photoelectrically convert an object image formed by the catadioptric optical system; and
an image processing system configured to generate image information based on data from the image-pickup element,
wherein the catadioptric optical system comprises:
a catadioptric unit configured to form an intermediate image of the object;
a field lens disposed at a position where the intermediate image is formed; and
a dioptric unit configured to form an image of the intermediate image, the dioptric unit including a plurality of dioptric optical elements,
wherein the catadioptric unit includes:
a first optical element including a first light transmission part having a convex surface on an object side, a positive refractive power near an optical axis, and a first backside reflector having a first reflective film on a surface on the object side in a periphery; and
a second optical element including a second light transmission part having a concave surface on the object side, a meniscus shape, a negative refractive power near the optical axis, and a second backside reflector having a second reflective film on a surface on an image side,
wherein the light flux from the object passes through the first light transmission part, the second backside reflector, the first backside reflector, and the second light transmission part in this order, and is emitted to a field lens side, and
wherein the following condition is satisfied:

$$vdio < vcat,$$

where vcat denotes a smallest Abbe number in Abbe numbers of materials of the first and second optical elements, and vdio denotes a smallest Abbe number in Abbe numbers of materials of the plurality of dioptric optical elements.

* * * * *